R. T. AND M. H. JONES.
DRIVING MECHANISM FOR VEHICLES.
APPLICATION FILED NOV. 22, 1918.
1,330,121. Patented Feb. 10, 1920.
3 SHEETS—SHEET 3.
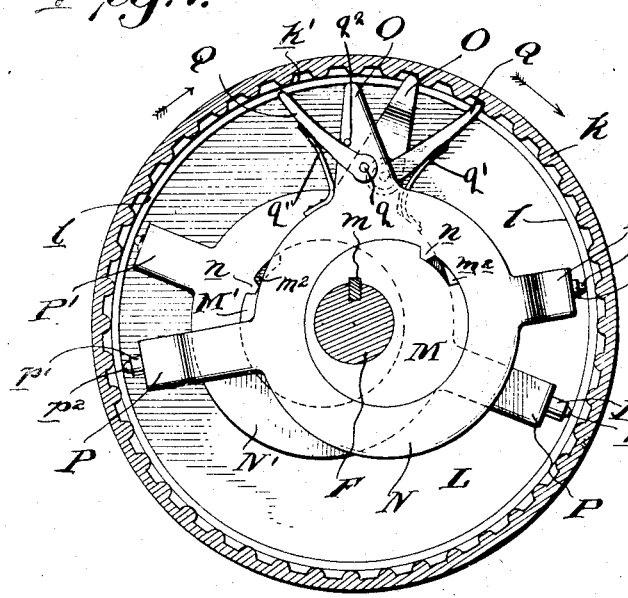
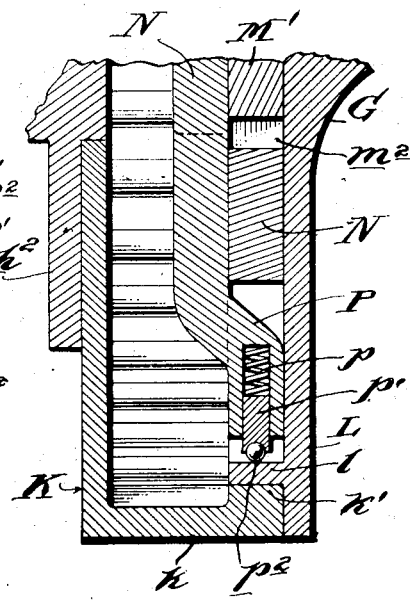
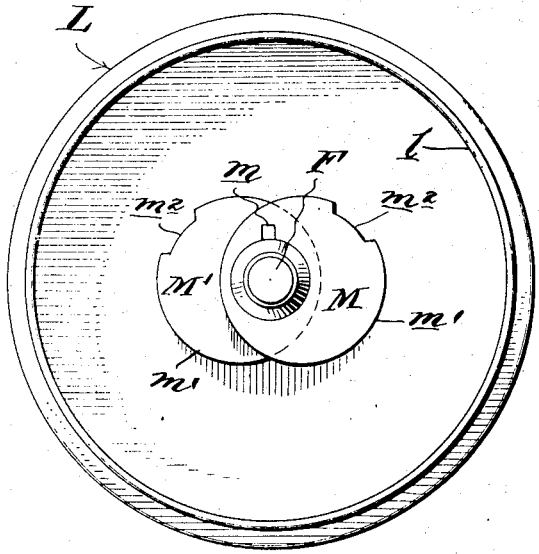
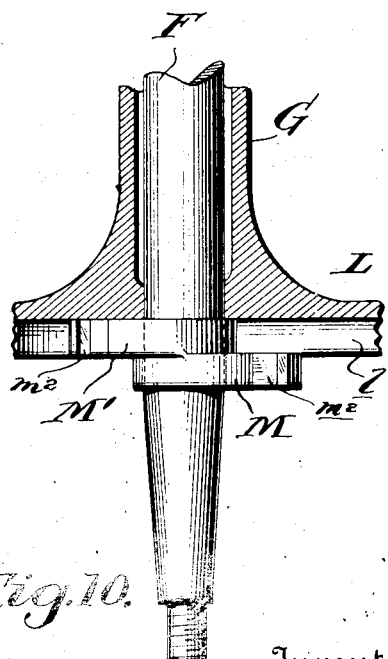
Inventor
Richard T. Jones
Madeline H. Jones
Baldwin Wright
By their Attorneys
Witness

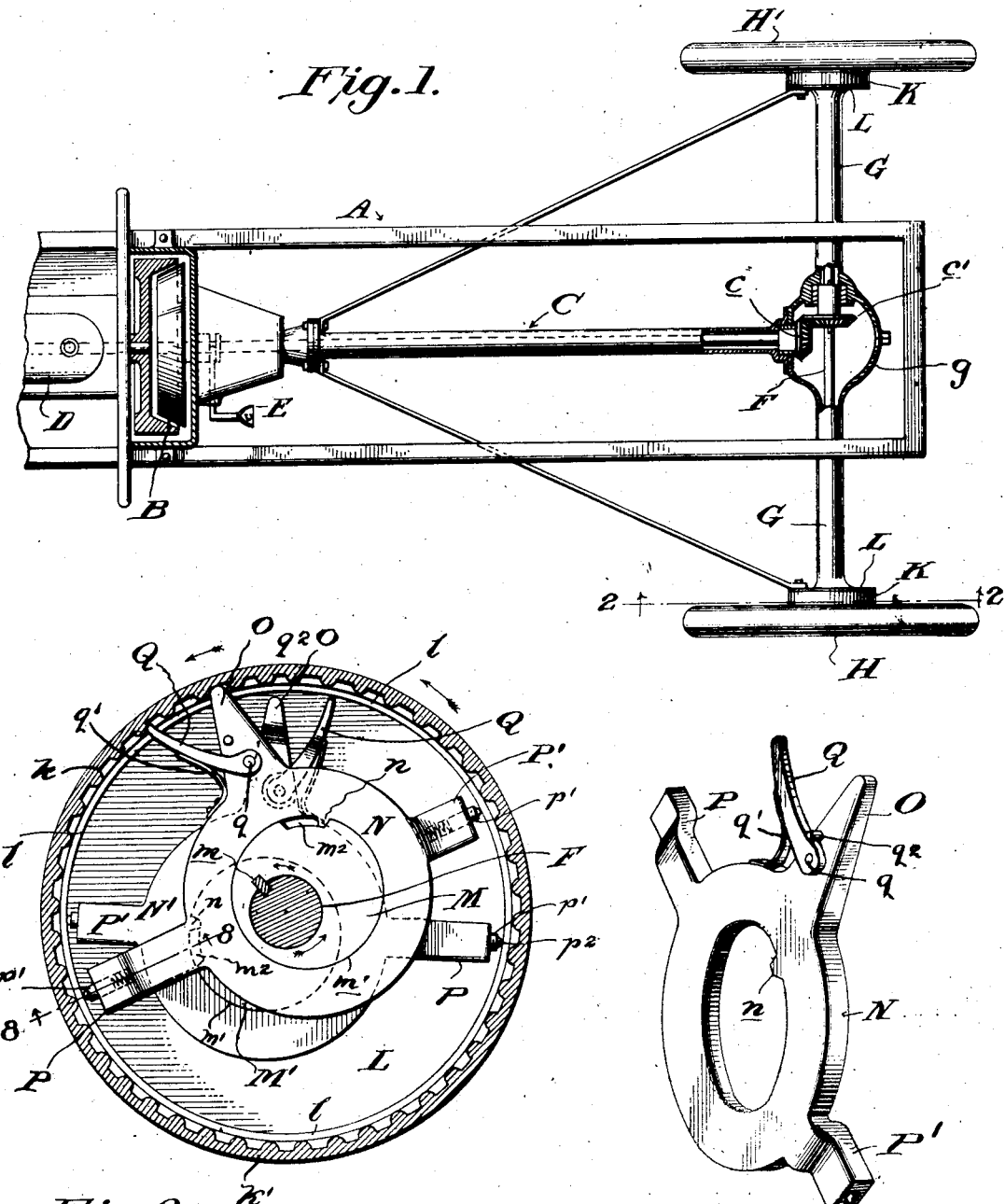

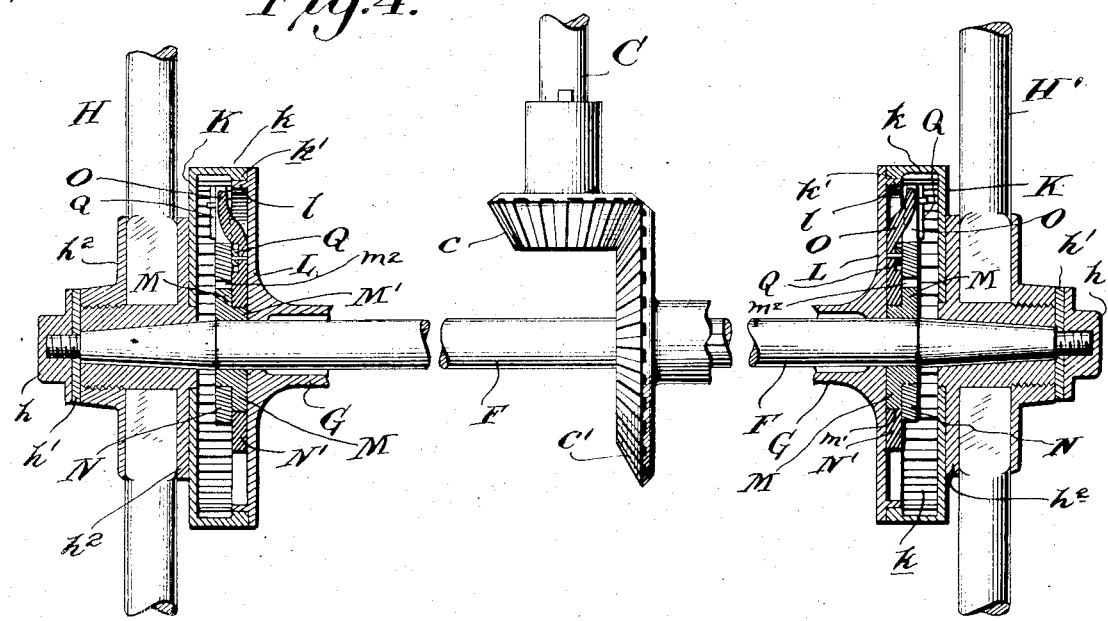

UNITED STATES PATENT OFFICE.

RICHARD THOMAS JONES AND MADELINE HELENA JONES, OF BALTIMORE, MARYLAND.

DRIVING MECHANISM FOR VEHICLES.

1,330,121.  Specification of Letters Patent.  Patented Feb. 10, 1920.

Application filed November 22, 1918. Serial No. 263,686.

*To all whom it may concern:*

Be it known that we, RICHARD THOMAS JONES and MADELINE HELENA JONES, both citizens of the United States, and both residing in Baltimore, Maryland, have invented certain new and useful Improvements in Driving Mechanism for Vehicles, of which the following is a specification.

This invention relates to the driving mechanism of motor driven vehicles and the special object of our invention is to provide in this class of mechanism what we call "a gearless differential and solid axle."

Ordinarily the rear wheels of motor vehicles are rigidly connected to the outer ends of a divided axle, *i. e.*, an axle made in two parts, each of which carries at its inner end a bevel gear, meshing with a system of gears connected to the rear end of a longitudinal shaft, which is connected with the engine by a clutch under the control of a chauffeur or driver.

In such a construction the gearing is at times subjected to undue strain, often causing the gears to strip or otherwise get out of order and the tires of the wheels to be injured. In taking a curve one of the wheels often stands still or drags, while the other revolves at a high speed. Furthermore, in such a construction there is often great wear and tear on the engine from lunging forward, coasting, etc.

According to our invention these objectionable features are overcome and done away with in a very simple way.

In carrying out our invention we employ a solid or continuous rear axle, and the driving wheels instead of being keyed to the axle are mounted to run loosely thereon as in the case of ordinary wagon wheels. The axle is driven from the engine by means of a shaft which is connected to the engine by a clutch under the control of the chauffeur or driver, and said shaft is geared permanently with the rear axle by bevel gears, which are inclosed in a housing from which extend sleeves that inclose the axle. Each rear wheel is mounted loosely on one end of the axle, and its hub has rigidly secured to it a flanged disk which connects with a flange projecting laterally from a disk on the end of the axle sleeve.

This construction provides housings for the mechanism which operatively connects the wheels with the axle when it is motor driven.

Rigidly secured to the axle near each end is a pair of cams or eccentrics, and each of these cams coöperates with a ring, provided with a dog adapted to engage the flange of the disk carried by the adjacent wheel hub. The arrangement is such that ordinarily or normally the wheels may be driven by the engine, through the rear axle, but should the wheels or either of them tend to run ahead of the engine, then the dog or dogs will be released and the wheel or wheels will revolve independently of the axle. One of the eccentrics at each end of the axle is employed for driving the car forward and the other for moving it rearward, and the arrangement is such that they do not in any way interfere with each other. Other features of the invention will be hereinafter described.

In the accompanying drawings:—

Figure 1 is a plan view of so much of a motor driven vehicle as is necessary to illustrate an embodiment of our invention, some parts being shown in section.

Fig. 2 is a view on an enlarged scale and in section on the line 2—2 of Fig. 1.

Fig. 3 is a perspective view of one of the outer eccentric rings.

Fig. 4 is a sectional view illustrating the connections between the driving shaft, the rear axle, and the two rear wheels.

Fig. 5 is a view similar to Fig. 2 with the mechanism in neutral position or in the position it would occupy should the wheels be revolved faster than the axle.

Fig. 6 is a perspective view of one of the inner eccentric rings.

Fig. 7 is a sectional view similar to Fig. 2 but showing the position of the parts when the axle drives the wheels rearwardly.

Fig. 8 is a detail view in section on the line 8—8 of Fig. 2.

Fig. 9 is a view illustrating particularly the arrangement of the eccentrics with the eccentric rings removed.

Fig. 10 shows a horizontal section of parts of the mechanism with the cams or eccentrics in plan.

The frame of the vehicle is indicated at A, and B indicates clutch mechanism of well known construction which connects the shaft C with the engine D. E indicates means for controlling the clutch. The rear axle F is solid or continuous and is arranged in a suitable sleeve casing G. The shaft is permanently connected with the rear axle by bevel gears $c$, $c'$ surrounded by a housing $g$. Each rear wheel H, H' turns freely on the axle and it is held thereon in any suitable way, as by a nut $h$ and washer $h'$. Each wheel hub $h^2$ has rigidly secured to its inner side a disk K, the flange $k$ of which is formed with an interior annular bearing $k'$, which surrounds an annular flange $l$ on the stationary circular plate L, surrounding the outer end of the housing or sleeve G. The interior of the flange $k$ is preferably toothed, corrugated, or roughened as indicated for a purpose hereinafter described.

The rear axle carries near each end two eccentrics M, M' and these are keyed to the axle as indicated at $m$. Each of these eccentrics has for the most part a continuous cam surface $m'$ but each is formed with a recess $m^2$ for a purpose hereinafter explained. Associated with each eccentric is an eccentric ring N or N', formed on its inner side with a lug $n$ extending into a recess $m^2$ in one of the eccentrics. Said lug is free to move in the recess to a limited extent. From the periphery of each ring extends a dog O adapted at times to engage the interior of the flange $k$ of the disk K. Each eccentric ring is also formed with outwardly extending arms P, P', which are adapted to engage the flange $l$ of the disk L. These arms (as most clearly indicated in Fig. 8) are recessed at $p$ and carry spring pressed ball carriers $p'$, the balls $p^2$ of which are adapted to press on the flange $l$.

The spring pressed balls bear at all times against the flange $l$ and serve to prevent the eccentric rings from moving with the eccentrics when the latter are first turned, i. e., when they are moved to force the dogs O radially outward into engagement with the flanges $k$. At this time the lugs $n$ move relatively to the eccentrics in the slots $m^2$, and the ball carrying arms P, by reason of their engagement with the flange $l$, insure this relative movement. Otherwise the eccentric rings would turn with the eccentrics. Furthermore, the ball carrying arms prevent the eccentric rings from slipping or turning relatively to the eccentrics except when the latter are positively moved.

Preferably each dog O is associated with a spring pressed pawl Q which assists in directing the dog into engagement with the flange $k$. Each pawl Q is pivoted at $q$ to a dog O and is normally held by spring $q'$ against the stop pin $q^2$. In the position shown in Fig. 5 both the dog and pawl are out of engagement with the flange. When the eccentric is first turned it does so without turning the ring N or N' as before explained but the dog and the pawl are moved radially outward. If the outer ends of the dog and the pawl enter spaces between the teeth of the flange $k$ the engagement of the dog with the toothed flange is properly made, but if the outer end of the pawl abuts against the crown of a tooth the outer end of the dog will be located opposite the crown of another tooth. At this time or immediately afterward a strain is put on the pawl which is communicated to the dog and the latter is turned or forced backward or in a direction opposite to that in which the eccentric is moved until the outer end of the dog comes opposite a space between two teeth and immediately after this the end of the dog will be properly entered between two adjacent teeth. In this way the pawls Q assist in obtaining a proper engagement of the dogs with the flange $k$ of the disk K. Practical experience has demonstrated that the pawls are very useful in insuring proper engagement of the dogs with the flange when the latter is toothed.

As before stated when the shaft C is connected by the clutch B with the engine D, the rear axle is driven from the engine. When driving forward the axle will drive the wheels H, H' by the mechanism before described, which will then be disposed in the manner indicated in Fig. 2. At this time it will be observed that the lug $n$ is in the rear portion of the recess $m^2$ and the dog O engages the flange $k$. When in this condition the rear wheels will be driven forward by the engine. In Fig. 2 it will be observed that only one of the dogs O engages the flange $k$ when driving forward, the other dog O being out of engagement therewith and being thus held by the arms P connected with the eccentric ring which carries said dog. It will be observed that the dogs on the eccentrics are so arranged that when they are operated they are arranged at such angles as to exert an outward thrust on the flange of the disk K in the direction in which the axle is being turned. This is an advantage especially when the flange $k$ is not toothed as there is less liability of slipping. If the same dog were used in such a construction to turn the axle in the opposite direction, such outward thrust could not be obtained and there would be liability of the dogs slipping on the flange. Therefore, we employ two cams, two eccentric rings, and two dogs, by which arrangement we are enabled to obtain the advantages above specified. It will be observed that in the construction shown each cam operates to direct the dog into engagement with the flange of the disk K and thereafter a positive locking engagement is obtained between the cam and the eccentric ring by means of the lug $m$ operating in the slot $m^2$. The mechanism will remain in the condition shown in Fig. 2 as long as the wheels are driven by the engine and do not tend to turn faster than the axle, but should the wheels run ahead of the engine the dogs O which are then in engagement with the flange $k$ will be carried forward, the lugs $n$ moving in the recesses $m^2$. In doing this the eccentric rings move around the eccentrics and the dogs O are withdrawn from engagement with the flanges $k$, so that the wheels are then free to revolve faster than the axle and no strain is placed on said axle or on the engine.

In Fig. 5 we have illustrated the condition of the mechanism when the wheels are running forward faster than the axle and it will be observed that there is no driving connection at this time between the axle and the wheels, all the dogs being out of engagement with the hubs of the wheels.

When it is desired to move the vehicle rearward, the mechanism assumes the condition shown in Fig. 7. In this case it will be observed that the inner eccentric ring is brought into operation and its dog O is in engagement with the flange $k$ of the disk which drives the hub. It will be understood that the mechanism on the opposite end of the axle assumes the same condition at this time.

We have shown the preferred way of carrying out our invention, but it will be understood that the details of construction may be varied.

The particular clutch mechanism shown forms no part of our improvements and the rear axle may be driven in other ways.

While we have shown and described our invention as applied to a well known class of automobiles we wish it understood that it may be applied to motor driven vehicles of various kinds.

Practical experience has demonstrated that by our invention the objectionable features of automobile drives of usual construction are avoided. There is no danger at any time of the gears being stripped. The drive wheels revolve loosely on the axle and there is no danger of one wheel dragging when on a curve. One wheel can turn slowly or stand still while the other revolves rapidly when the engine is disconnected while either going forward or backward and without any bad effect. When motor driven one of the wheels cannot stand still while the other spins or revolves at a high rate of speed. It is immaterial whether one wheel is in the mud and the other on good ground, as they must both turn coincidently and exert the same force when moving in either direction. The car may be reversed while in motion and may readily go down a hill under compression. Furthermore the life of a car equipped with our improvements will be greatly increased as there is no wear and tear on the engine from lunging forward or coasting, for as soon as the car starts to coast the wheels will run free on the axle and much of the jar or wear on the machinery incident to other driving mechanism is avoided.

We claim as our invention:

1. Driving mechanism for vehicles, comprising an axle, wheels loosely mounted on said axle and adapted to revolve freely thereon, and clutch mechanism for connecting each wheel with the axle comprising a flanged disk attached to a wheel, a cam attached to the axle, a ring surrounding the cam and operated thereby, a dog carried by the ring and adapted to engage said flanged disk, and a spring pressed pawl coöperating with said dog to insure the engagement of the dog with said flanged disk.

2. Driving mechanism for vehicles, comprising a rear axle, wheels loosely mounted on said axle and adapted to revolve freely thereon, and clutch mechanism for connecting each wheel with the axle, comprising a stationary flanged plate, a flanged disk attached to a wheel, a cam on the axle, a ring surrounding the cam and operated thereby, a dog carried by the ring and adapted to engage the flanged disk, and arms projecting from the ring and having parts bearing on said stationary flanged plate to prevent the ring from moving with the cam while the dog is being directed into engagement with said disk.

3. Driving mechanism for vehicles, comprising an axle, wheels loosely mounted on said axle and adapted to revolve freely thereon, and clutch mechanism for connecting each wheel with the axle comprising a flanged disk attached to a wheel, a cam attached to the axle, a ring operated by the cam, a dog carried by said ring and adapted to engage said flanged disk, a flanged disk associated with the flanged disk first mentioned, and arms carrying spring pressed balls projecting from the ring and adapted to engage one of said flanged disks.

4. Driving mechanism for vehicles, comprising an axle, wheels loosely mounted on said axle and adapted to revolve freely thereon, motor operated means for driving said axle, and clutch mechanism for connecting each wheel with the axle for moving it either forward or rearward, comprising a driven member attached to a wheel, a pair of cams attached to the axle, rings surrounding the cams and operated thereby, a dog on each of the rings adapted to engage the driven member of the clutch, arms projecting from each ring and provided with yielding devices, a stationary flanged member with which said yielding devices engage to prevent the ring from moving with the cam while the dog is being directed into engagement with said driven member, and means for positively connecting the cam with the ring during the driving operation.

5. Driving mechanism for vehicles, comprising an axle, wheels loosely mounted on said axle and adapted to revolve freely thereon, power operated means for driving the axle, and clutch mechanism for connecting each wheel with the axle for driving it either forward or backward comprising a flanged disk attached to a wheel, a pair of cams attached to the axle, rings surrounding the cams and operated thereby, a dog carried by each ring and adapted to engage said flanged disk, and means carried by the rings for holding them in the position to which they are set.

6. Driving mechanism for vehicles, comprising an axle, wheels loosely mounted on said axle and adapted to revolve freely thereon, power mechanism for driving the axle, and clutch mechanism for connecting each wheel with the axle comprising a flanged disk attached to a wheel, a cam attached to the axle and having a recess in its periphery, a ring surrounding the cam and having a lug extending into said recess and movable to a limited extent therein about the periphery of the disk, a dog carried by the ring and adapted to engage the flanged disk and means carried by the rings for holding them in the position for which they are set.

7. Driving mechanism for vehicles, comprising an axle, wheels loosely mounted on said axle and adapted to revolve freely thereon, power operated means for driving the axle, and clutch mechanism for connecting each wheel with the axle comprising a flanged disk attached to a wheel, a cam attached to the axle and having a recess in its periphery, a ring surrounding the cam and having a lug extending into said recess and adapted to move therein, a dog carried by said ring and adapted to engage the flanged disk, and means for holding the lug at one end of said recess to hold the dog in withdrawn position from said flanged disk, but which permits the cam to move the ring in such manner as to force the dog into engagement with said disk.

8. Driving mechanism for vehicles, comprising an axle, wheels loosely mounted on said axle and adapted to revolve freely thereon, power operated means for driving said axle, and clutch mechanism for connecting each wheel with the axle comprising a flanged disk attached to a wheel, a pair of cams attached to the axle and each having a recess in its periphery, a ring surrounding each cam and having a lug extending into said recess and which is adapted to have a limited movement about the periphery of the cam, a dog carried by each ring and adapted to engage the flanged disk, and means for holding the ring in such position as to withdraw said dog from engagement with the disk when moving in one direction or for holding it in engagement with the disk when turned in the opposite direction.

9. Driving mechanism for vehicles, comprising an axle, wheels loosely mounted on the axle to at times revolve freely thereon and to turn independently of each other at the same or different speeds, and means for automatically connecting or disconnecting the wheels with the axle when going either forward or backward and when the wheels or either of them tend to run ahead of the engine, comprising clutch mechanism for driving each wheel in one direction and other clutch mechanism for driving each wheel in the opposite direction each of said clutch mechanisms comprising a driven member attached to a wheel, a pair of cams attached to the axle, rings surrounding the cams and operated thereby, a dog on each ring adapted to engage the driven member of the clutch, arms projecting from each ring and provided with yielding devices, a stationary flanged member with which said yielding devices engage to prevent the ring from moving with the cam while the dog is being directed into engagement with said driven member, and means for positively connecting each cam with the ring during the driving operation.

In testimony whereof, we have hereunto subscribed our names.

RICHARD THOMAS JONES.
MADELINE HELENA JONES.